US009260647B2

(12) United States Patent
Crews

(10) Patent No.: US 9,260,647 B2
(45) Date of Patent: *Feb. 16, 2016

(54) METALLIC PARTICLE MEDIATED VISCOSITY REDUCTION OF VISCOELASTIC SURFACTANTS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/295,544

(22) Filed: Nov. 14, 2011

(65) Prior Publication Data

US 2013/0123151 A1 May 16, 2013

(51) Int. Cl.
*C09K 8/03* (2006.01)
*C09K 8/66* (2006.01)
*C09K 8/68* (2006.01)

(52) U.S. Cl.
CPC . *C09K 8/03* (2013.01); *C09K 8/665* (2013.01); *C09K 8/68* (2013.01); *C09K 2208/30* (2013.01)

(58) Field of Classification Search
CPC ............ C09K 8/68; C09K 8/80; C09K 8/805; C09K 8/516; C09K 2208/30; C09K 8/665; C09K 8/706; C09K 2208/10; C09K 2208/26; C09K 8/74; C09K 8/572; C09K 8/70; C09K 8/602; C09K 8/565; C09K 8/575; C09K 2208/18; C09K 2208/28; C09K 8/03; C09K 8/42; C09K 8/467; C09K 8/487; C09K 8/508; C09K 8/52; C09K 8/56; C09K 8/62; C09K 8/88; C09K 8/887; C09K 8/92; C09K 2208/24; C09K 8/50; C09K 8/601; C09K 8/703; C09K 8/82; C09K 8/90; C09K 8/94; Y10S 507/924; Y10S 507/921
See application file for complete search history.

(56) References Cited

U.S. PATENT DOCUMENTS

| 6,024,915 | A * | 2/2000 | Kume | B22F 1/02 419/35 |
|---|---|---|---|---|
| 7,595,284 | B2 | 9/2009 | Crews | |
| 2006/0041028 | A1* | 2/2006 | Crews | B01D 17/047 516/135 |
| 2006/0166838 | A1* | 7/2006 | Collins | B01J 13/125 507/219 |
| 2006/0211775 | A1* | 9/2006 | Crews | C09K 8/506 516/109 |
| 2006/0211776 | A1* | 9/2006 | Crews | C09K 8/602 516/197 |
| 2007/0151726 | A1* | 7/2007 | Crews | C09K 8/602 166/246 |
| 2008/0105438 | A1* | 5/2008 | Jordan | C22C 1/0408 166/376 |
| 2010/0263866 | A1* | 10/2010 | Huang | C09K 8/506 166/282 |
| 2011/0135953 | A1* | 6/2011 | Xu | B22F 1/102 428/548 |

OTHER PUBLICATIONS http://en.wikipedia.org/wiki/Micro-encapsulation download Mar. 3, 2014.*
Nable, J., Gulbinska, M., Suib, S. L., Galasso, F., Aluminum oxide coating on nickel substrate by metal organic chemical vapor deposition, Surface and Coatings Technology , 2003, 173, 74-80.*
Nable, J., Gulbinska, M., Suib, S. L., Galasso, F., Aluminum oxide coating on nickel substrate by metal organic chemical vapor deposition, Surface and Coatings Technology, 2003, 173, 74-80.*
http://en.wikipedia.org/w/index.php?title=Iron(II)_hydroxide &printable=yes downloaded on Jun. 27, 2014.*
http://en.wikipedia.org/w/index.php?title=Iron(II)_chloride &printable=yes downloaded on Jun. 27, 2014.*
http://en.wikipedia.org/wiki/Micro-encapsulation downloaded on Mar. 3, 2014.*

* cited by examiner

*Primary Examiner* — Susannah Chung
*Assistant Examiner* — Kumar R Bhushan
(74) *Attorney, Agent, or Firm* — Cantor Colburn LLP

(57) ABSTRACT

A method for breaking the viscosity of an aqueous fluid gelled with a viscoelastic surfactant (VES) is disclosed. The method includes providing an aqueous fluid and adding to the aqueous fluid, in any order: at least one VES comprising a nonionic surfactant, cationic surfactant, amphoteric surfactant or zwitterionic surfactant, or a combination thereof, in an amount sufficient to form a gelled aqueous fluid comprising a plurality of elongated micelles and having a viscosity, and a plurality of metallic particles to produce a mixture comprising dispersed metallic particles dispersed within the gelled aqueous fluid. The method also includes dissolving the metallic particles in the gelled aqueous fluid to provide a source of at least one transition metal ion in an amount effective to reduce the viscosity.

19 Claims, 2 Drawing Sheets

METALLIC PARTICLE MEDIATED VISCOSITY REDUCTION OF VISCOELASTIC SURFACTANTS

BACKGROUND

Viscosity controlled wellbore fluids comprising gels, such as viscoelastic surfactant gels, are used for various purposes in wellbore operations, such as drilling, completion, production and sequestration or other operations, particularly during hydrocarbon recovery operations. These viscosity controlled fluids must be adapted to form high viscosity fluids for operations such as fracturing, but must also be adapted for "breaking" or reducing their viscosity for subsequent operations, such as hydrocarbon recovery operations.

Fracturing fluids are complex and must simultaneously provide high temperature stability at high pump rates and fluid shear rates that may tend to cause the fluids to degrade and prematurely settle out constituents, such as proppant, before the fracturing operation is complete. Various fracturing fluids have been developed, but most commercially used fracturing fluids are aqueous-based liquids or fluids that have either been gelled or foamed using a gelling agent. Polymeric gelling agents, such as solvatable polysaccharides that are gelled by crosslinking to increase viscosity have been used. Non-polymeric viscoelastic surfactant (VES) gelling agents have also been used. In many cases, VES materials are advantageous compared to polymer gelling agents because they employ low molecular weight surfactants rather than high molecular weight polymers and may leave less gel residue within the pores of oil producing formations, leave no filter cake on the formation face and minimal amounts of residual surfactant coating the proppant, and inherently do not create microgels or fish-eye-type polymeric masses.

VES materials also require breaker systems for the non-polymeric VES-based gelled fluids to reduce their viscosity after use. These have generally included using external or reservoir conditions for viscosity reduction (breaking) and VES fluid removal (clean-up) during hydrocarbon production, as well as rearranging, disturbing, and/or disbanding of the VES worm-like micelle structure by contact with hydrocarbons within the reservoir, more specifically contacting and mixing with crude oil and condensate hydrocarbons. While useful, these breaker systems have limitation, including incomplete removal of the VES fluids, resulting in residual formation damage (e.g., impairment of hydrocarbon production). Post-treatment clean-up fluids composed of either aromatic hydrocarbons, alcohols, surfactants, mutual solvents, and/or other VES breaking additives have been employed in an attempt to break the VES fluid for removal, but their effectiveness has been limited, resulting in well sections with unbroken or poorly broken VES-gelled fluid that impairs hydrocarbon production, or in production delays associated with instances where VES breaking and clean-up takes a long time, such as several days up to possibly months to break and then produce the VES treatment fluid from the reservoir.

Internal breakers that are activated within the fluid, such as by downhole temperatures have also been used with VES-gelled fluids, and typically allow a controlled rate of gel viscosity reduction in 1 to 8 hours, similar to gel break times common for conventional crosslinked polymeric fluid systems. VES-gelled fluids are not comprised of polysaccharide polymers that are easily degraded by use of enzymes or oxidizers, but are comprised of surfactants that associate and form viscous rod-shaped or worm-shaped micelle structures. Conventional enzymes and oxidizers have not been found to act and degrade the surfactant molecules or the viscous micelle structures they form. Other internal breakers for VES-gelled fluids have been proposed in U.S. Pat. No. 7,595,284 B2 to Crews, which describes aqueous fluids viscosified with viscoelastic surfactants (VES) that may have their viscosities affected (i.e., reduced or broken) by the indirect or direct action of a composition that contains at least one metal ion source and optionally at least one second source. An optional second source may be a chelating agent where at least one reducing agent source may be additionally optionally used. Another optional component with the metal ion source includes a second different metal ion source. The breaking composition is believed to directly attack the VES itself, possibly by disaggregating or otherwise attacking the micellar structure of the VES-gelled fluid through chemical alteration of the VES compound and/or possibly by changing the chemical structure of the VES to give two or more products.

While these internal breakers are very useful, the development of additional internal breakers to provide enhanced control of the breaking of VES fluids is very desirable, particularly in view of the widespread use of these fluids in fracturing and other downhole operations.

SUMMARY

In an exemplary embodiment, a method for breaking the viscosity of an aqueous fluid gelled VES is disclosed. The method includes providing an aqueous fluid and adding to the aqueous fluid, in any order: at least one VES comprising a non-ionic surfactant, cationic surfactant, amphoteric surfactant or zwitterionic surfactant, or a combination thereof, in an amount sufficient to form a gelled aqueous fluid comprising a plurality of elongated micelles and having a viscosity, and a plurality of metallic particles to produce a mixture comprising dispersed metallic particles dispersed within the gelled aqueous fluid. The method also includes dissolving the metallic particles in the gelled aqueous fluid to provide a source of at least one transition metal ion in an amount effective to reduce the viscosity.

BRIEF DESCRIPTION OF THE DRAWINGS

Referring now to the drawings wherein like elements are numbered alike in the several Figures.

DETAILED DESCRIPTION

Figure 1:
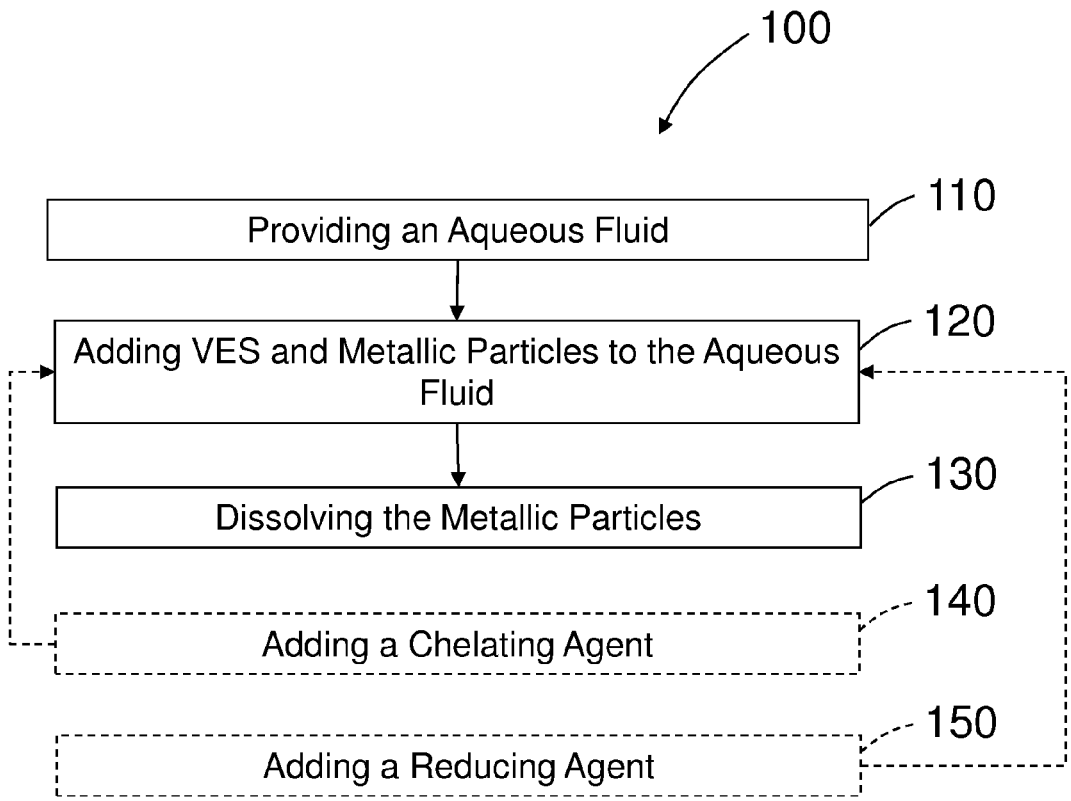
FIG. 1 is a flowchart illustrating an exemplary embodiment of a method of affecting viscosity as disclosed herein.

Referring to the Figures, and particularly FIG. 1, a method 100 for breaking the viscosity of aqueous fluids gelled with VES (i.e. surfactants that develop viscosity in aqueous brines by formation of rod-shaped or worm-shaped micellar structures) is disclosed. The method 100 may advantageously be employed to provide an internal breaker to break the viscosity of aqueous fluids gelled with VES, but may also be employed to provide an external breaker. The method 100 will allow selectively controllable breaks, such as within about 0.5 to about 96 hours. The method 100 provides improved control over various aspects of the breaks, including, without limitation, the timing of breaking of the aqueous fluids gelled with VES by providing a selectively controllable breaking mechanism. The improved control may include selectively controlling the onset or initiation of breaking, the rate at which the viscosity is broken, and the extent or extensiveness of the breaking that occurs. The extent or extensiveness to which the breaking occurs may be assessed in any suitable manner, such as by measuring the volume percentage of the fluid that has its viscosity reduced, or by measuring the reduction of the viscosity that occurs during breaking, or the like. The method utilizes the dissolution of metallic particles to provide a source of transition metal ions sufficient for breaking the gelled aqueous fluid. This may enable breaking over a wider temperature range or at higher breaking rates in order to achieve enhanced viscosity break characteristics, such as nearly right angle break profiles corresponding to very high rates of change of the viscosity, including rapid increases, decreases or rapid increases followed by rapid decreases. The rate of breaking induced by dissolution of the metal particles may be further controlled by employing various bases and salts, particularly alkaline metal and alkaline earth metal bases and salts, such as NaOH, KOH, NaCl, KCl, $MgCl_2$, $CaCl_2$, $CaBr_2$ and the like.

The fact that fluids viscosified with a VES may have their viscosities broken by the indirect or direct action of a composition that contains at least one metal ion source and optionally at least one second source is described in U.S. Pat. No. 7,595,284 B2 to Crews, which is hereby incorporated herein by reference in its entirety. The '284 patent also describes an optional second source that may be a chelating agent where at least one reducing agent source may be additionally optionally used. Another optional component with the metal ion source includes a second, different metal ion source. The breaking composition is believed to directly attack the VES itself, possibly by disaggregating or otherwise attacking the micellar structure of the VES-gelled fluid through chemical alteration of the VES compound and/or possibly by changing the chemical structure of the VES to give two or more products. This application discloses particular advantages, particularly enhanced control of the dissolution reaction and breaking characteristics of the gelled aqueous fluid that may be gained by the incorporation of metallic particles into the aqueous fluid.

The method 100 for breaking the viscosity of an aqueous fluid gelled with a viscoelastic surfactant (VES) includes providing 110 an aqueous fluid and adding 120 to the aqueous fluid, in any order: at least one VES comprising a non-ionic surfactant, cationic surfactant, amphoteric surfactant or zwitterionic surfactant, or a combination thereof, in an amount sufficient to form a gelled aqueous fluid comprising a plurality of elongated micelles and having a viscosity, and a plurality of metallic particles to produce a mixture comprising dispersed metallic particles dispersed within the gelled aqueous fluid. The method 100 also includes dissolving 130 the metallic particles in the gelled aqueous fluid to provide a source of at least one transition metal ion in an amount effective to reduce the viscosity. The method 100 and adding 120 may also optionally include adding 140 at least one chelating agent to the aqueous fluid. The method 100 and adding 120 may also optionally include adding 150 at least one reducing agent source to the aqueous fluid.

A new method 100 has been discovered to reduce the viscosity of aqueous fluids gelled with VES. The improvement will allow relatively rapid and selectively controllable breaks, as described herein. The breaker components, including the metallic particles, described herein may be added directly to the gel as it is being prepared or into solution during a VES-gel treatment as an internal breaker, or the components may be added separately, if needed, as an external breaker solution to remove VES gelled fluids already placed downhole.

The method 100 employs metallic particles to provide at least one transition metal ion source as a breaker component. The alteration that occurs in breaking the VES gel is transition metal-mediated and/or transition metal-catalyzed. The terms "metal-mediated" and "metal-catalyzed" are used herein as equivalent terms to indicate that a transition metal is required for the reaction or sequence of reactions to occur, regardless of whether the mechanism is catalytic.

The terms "altered" and "alteration" mean any change to the VES compound where it can no longer form, maintain or sustain viscous micellar structures. The terms "altered" or "alteration" may include, but are not necessarily limited to: (i) a rearrangement of bonds on the VES, (ii) an addition to the VES (such as hydrogen, water molecule, etc.) or (iii) an elimination (decomposition or degradation) of the VES, e.g. where the VES after alteration now equals two or more other compounds.

The primary reaction that chemically alters the VES structure includes a redox reaction since both reduction and oxidation occur in the reaction. A "redox" reaction is defined herein to be any reaction in which electrons are removed from one molecule or atom and given to another molecule or atom. In the processes described herein, such redox reactions are transition metal-mediated.

In most cases in the methods described herein, the alteration that occurs is not complete; meaning not all of the VES (e.g. VES compounds such as Akzo Nobel Aromox APA-T) is altered; only a portion of the molecules has been altered. In practical terms, the metal-mediated alteration results in a ratio of altered to unaltered VES molecules. That is, typically a "broken VES fluid" is composed of a ratio of altered to unaltered VES molecules.

Based on observation of the "residual material" that is sometimes left as a separate liquid phase after VES gel breaking occurs, the ratio or amount of altered to unaltered VES molecules that cause VES gel break may be based on one or more factors, including: a. less altered VES is required to break the gel as fluid temperature increases; b. more altered VES is required to break the gel as VES (such as Aromox APA-T VES) loading increases; c. more altered VES is required to break the gel when VES counterions or stabilizing agents are used, including, $CaCl_2$, $CaBr_2$, MgO, CaOH, $NH_4Cl$, salicylate, naphthalene sulfonate, phthalate and the like. In most cases it appears the VES (compounds such as Aromox APA-T) is predominantly altered into a non-VES surfactant compound or chemical species, for example, a surfactant species that is not able to form viscous micelles (elongated or worm-like micelle structures) or it remains predominantly a surfactant that has lost the ability to form VES micelles.

In some cases the altered VES may be the VES surfactant degraded to a hydrocarbon tail and a hydrophilic head. Thus, the term "decomposition" may be used for describing the breaking of the VES-gelled fluid, but "metal-mediated" and "alteration" of the VES are better terms for explaining the breaking phenomenon that occurs. As mentioned above, in most cases the VES compound is predominantly altered into a non-VES type surfactant. However, it may be understood that the surfactant (or surfactants or products) generated are not as soluble or as dispersible in water. That is, it has been found that the surfactant character of the products is overall less hydrophilic, and/or the Hydrophilic-Lipophilic Balance (HLB) appears to be altered, and the HLB number appears to be lower.

It is not clear what linkages or bonds are altered in the primary reactions that occur, or whether the alteration occurs on the hydrocarbon tail or the surfactant head group. It is also uncertain what specific alterations occur, such as electron addition, electron removal, hydrogenation (electron and proton addition), dehydrogenation (electron and proton removal), and the like during the metal-mediated redox reactions. However, without being limited by theory, the head group may be the component that is chemically altered or modified (by metal-mediated redox reactions) to have less solubility and/or dispersibility in water, particularly brine (salt) water that is typically used for hydraulic fracturing operations.

The altered VES species appears to associate with the unaltered VES and as the ratio of altered to unaltered VES increases, a point is reached where the amount of altered VES present does not allow the unaltered VES surfactant to remain organized in worm-like or rod shaped viscous micelle structures, and thereby alters the micelle by rearrangement and a viscosity break is achieved. As long as the ratio of altered to unaltered VES remains relatively low the viscosity break that occurs is a uniphase fluid, a fluid that appears like water containing surfactants that does not yield viscosity, does not phase separate from the water, but gives the water a slight color (such as straw yellow and light amber in some non-limiting cases) and the broken fluid easily foams when shaken in a bottle, and has a viscosity resembling that of water.

However, it has been observed that if the ratio of altered to unaltered VES becomes relatively high, such as when significant amounts of breaker products are used and very quick VES gel breaks are achieved, generating relatively high amounts of altered VES will result in the altered VES separating as a liquid phase from the water phase, and the unaltered VES portion may also separate from the altered portion. The phase separation seen from relatively fast VES gel break times appears to be due to a number of factors including: (a) the amount of altered VES generated; (b) the apparent low HLB number of the altered VES species; (c) the altered VES associating more with itself (like an oil) than with water, apparently due to the low HLB; (d) the fact that low HLB number surfactants in general have less solubility and/or dispersibility in water, particularly in brine water (i.e. water with dissolved salts present, such as KCl, NaCl, $CaCl_2$, $CaBr_2$, etc.); (e) the ratio of altered to unaltered VES, particularly ratios where the amount of unaltered VES present is not able to keep the low HLB number surfactant in solution and/or dispersed in the water phase; (f) the unaltered VES separating from the altered VES surfactant species may be due to the over abundance of altered VES surfactant species present combined with having a strong attraction and interaction of the hydrocarbon tails that results in an oil-like surfactant liquid phasing out of the water phase; and (g) the liquid surfactant layer that may phase out with fast breaking fluid compositions when shaken in a bottle with the mix water brine will temporarily disperse within the mix water for several minutes to several hours, depending on the ratio of altered to unaltered VES within the fluid-liquid surfactant layer, or a combination of the above factors.

Solubilizing, dispersing, and/or stabilizing the altered and unaltered VES from phasing out of the water phase can be enhanced by the use of solvents, surfactants and hydrotropes, such as: glycerol, ethylene glycol and other glycols, methanol and other alcohols, ethylene glycol monobutyl ether and other glycol ethers, ethoxylated alcohols, alkyl glucosides, alkyl aromatic sulfonates, and the like, and combinations thereof. Solubilizing additive packages can be formulated to have enhanced performance compared to single component solvent, surfactant or hydrotrope additive use. One preferred synergistic additive package art is disclosed in U.S. Pat. No. 7,655,603 B2 to Crews, which is assigned to the same assignee as this application, Baker Hughes, Inc., and which is incorporated herein by reference in its entirety.

The particular ratio of altered to unaltered VES appears to depend on a number of factors, some of which may have been identified. The ratio seems to depend primarily on the amount of breaker products used, more specifically the amount of both the reducing agent (if present) and the metal ions. The ratio appears to also depend on the fluid temperature, the type and amount of mix water salt VES loading, and the like, and combinations thereof.

The alteration of the VES (such as Aromox APA-T) thus appears to be metal-mediated or metal-catalyzed. That is, the reaction occurs due to the presence of a transition metal. Transition metals may work alone at high enough metal concentrations. Generally, transition metals work faster (the viscosity breaking rate is enhanced) when they are complexed with a chelant. The transition metal may also work faster (the viscosity breaking rate is enhanced) in the presence of a reducing agent. The transition metal works significantly faster (the rate is significantly enhanced) with the synergistic combination of a chelant with reducing agent is used with the metal. The rate can further be enhanced if more than one metal ion is used with the combination of a chelant and a reducing agent. Further, an oxidizer can be activated by a metal and reducing agent combination. For example, a metal may be a catalyst to ascorbate and persulfate to generate free radical oxidation species, with such species then being the agents which act on altering the VES molecules. The metal ions do not always have to be the agent themselves acting on altering the VES directly, that is other redox alteration pathways that may be present that are metal-mediated, and which are within the methods and compositions herein.

The method 100 thus employs dissolvable metallic particles which serve as a metal ion source. The use of a metal ion possibly acting as a catalyst, such as ferrous iron, alone does not give any early or rapid breaking effect at concentrations up to 240 ppm, and the use of an organic redox agent alone, such as 10.0 to 20.0 pptg sodium ascorbate, does not give any particular breaking effect alone either, but the use of both components together provide a full and complete and rapid viscosity breaking of the gel, and the use of dissolvable metallic particles as a metal ion source alone at a high enough concentration may also break the gel.

Two preferred, but non-limiting, components of the inventive composition include ferrous chloride and sodium ascorbate. Controlled viscosity reduction rates can be achieved from 75° F. to about 350° F. (about 24° C. to about 177° C.). As noted, metallic particles may be selected to provide more than one transition metal ion can be combined for use with more than one redox and/or possibly hydrogenation-dehydrogenation agent. This may be accomplished in any suitable manner, such as, for example, by using metallic particles of a single particle composition that comprises an alloy or other mixture of more than one metal, or by using metallic particles having a plurality of different particle compositions, whether pure metals, alloys or other mixtures, and the like. More than one transition metal ion refers to the combination of two or more different transition metal ions. The utilization of more than one transition metal and more than one redox agent and/or possibly hydrogenation-dehydrogenation agent may have applications in controlling possible secondary reactions, that is, further reactions involving the remaining or altered viscoelastic surfactant substrate and/or to the degraded surfactant by-products. Besides the use of more than one metal, addition of other agents may also be employed that may influence the primary reaction (viscosity reduction) and secondary reactions (alteration of by-products), with agents such as pH buffers, alcohols, amines, sugars, and the like, and mixtures thereof.

The use of the disclosed breaker system is ideal for controlled viscosity reduction of VES-based fracturing fluids. The breaking system may also be used for breaking gravel pack and loss circulation pill fluids composed of VES. This VES breaking method is a significant improvement in that it gives breaking rates for VES based fluids that the industry is accustomed to with conventional polymer based fracturing fluids, such as borate crosslinked guar.

In one exemplary embodiment of the invention, the compositions herein will directly degrade or digest the gel created by a VES in an aqueous fluid, and alternatively will reduce the viscosity of the gelled aqueous fluid either directly, or by disaggregation or rearrangement of the VES micellar structure.

The composition of the aqueous fluid includes metallic particles that may be dissolved to provide at least one metal ion source where the goal is to deliver at least one metal ion to the VES-gelled system. The metallic particles and metal ions may be selected from metals described herein, including Group VA, VIA, VIIA, VIIIA, IB, IIB, IIIB or IVB of the Periodic Table (previous IUPAC American Group notation), or a combination thereof. These may include, for example, iron, copper, manganese, cobalt, chromium, zinc, nickel, vanadium, tin, aluminum, molybdenum, platinum, palladium, and mixtures thereof.

Any suitable metallic particles may be added to the aqueous fluid in accordance with method 100, and adding 120 may be performed in any suitable manner, including as a free-flowing powder of the metallic particles, or by premixing the metallic particles into the VES, or a combination thereof. Suitable metallic particles include those described above, which may be configured to be dissolved in the aqueous fluid to provide a source of transition metal ions, and particularly metallic cations that may provide metal-mediated or metal-catalyzed breaking of the gelled aqueous fluid. The metallic particles may be configured for selectively controllable dissolution and release of their associated cations in the aqueous fluid as described herein. The metallic cations may also interact or react with other constituents that may be added to the aqueous fluid, including the other breaking constituents described herein.

The metallic particles may have any suitable size, shape, composition and morphology (i.e. they may be substantially solid or porous or comprise an agglomeration or consolidation of several particles), but will preferably be configured to provide a predetermined amount of the metallic cations and a predetermined dissolution characteristic, such as a predetermined onset of dissolution, rate of dissolution, extent of dissolution and the like. In certain embodiments, the metallic particles may comprise substantially spherical solid or porous particles. In other embodiments, the metallic particles may have non-spherical shapes, including platelets, rods or other non-spherical shapes or rod-like shapes. In yet other embodiments, the particles may include an agglomeration or consolidation of a number of smaller particles as a powder compact or other consolidated form, and may have an open structure between the agglomerated or consolidated particles to provide a high surface area analogous to a zeolite.

Figure 2:
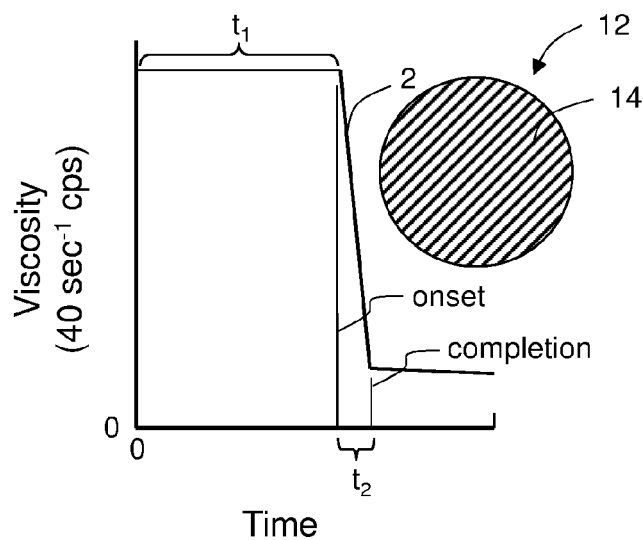
FIG. 2 is a schematic illustration of viscosity as a function of time for an exemplary embodiment of an aqueous fluid and method of affecting viscosity of the fluid as disclosed herein.
Figure 3:
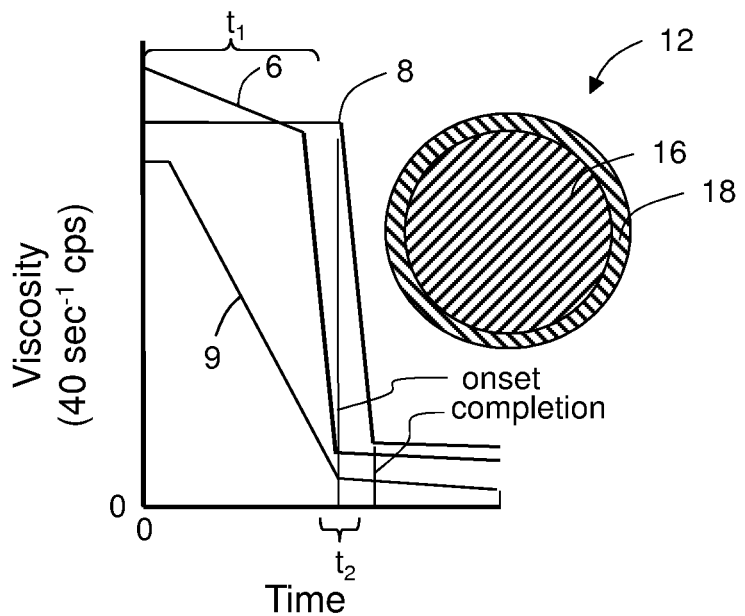
FIG. 3 is a schematic illustration of viscosity as a function of time for a second exemplary embodiment of an aqueous fluid and method of affecting viscosity of the fluid as disclosed herein.

In one embodiment, the metallic particles 12 may be uncoated metallic particles 14, such that the particles begin dissolving and affect breaking immediately upon being added to the aqueous fluid, or if encapsulated as described herein, when released into the gelled aqueous fluid to provide source of transition metal ions sufficient to cause metal-mediated or metal-catalyzed breaking of the gelled aqueous fluid as described herein as shown schematically in FIG. 2 by curve 2. It includes an interval $t_1$ during which an encapsulant dissolves and a second interval during which the uncoated metallic particle 14 dissolves. In another embodiment, the metallic particles 12 may be coated and include a coating layer 16 and a particle core 18 as shown in FIG. 3. It includes an interval $t_1$ during which the coating layer 16 dissolves and a second interval during which the particle core 18 dissolves. The coating layer, for example, may be selected to dissolve at a selectively controllable rate to provide a working interval for use of the gelled aqueous fluid, such as in a fracturing operation, and may cause the viscosity decrease as shown in curve 6 or remain substantially the same as shown in curve 8. Upon dissolution of the coating layer 16, the particle core 14 may also be selected to provide selectively controllable dissolution sufficient to provide metal-mediated or metal-catalyzed breaking of the gelled aqueous fluid as described herein and cause a rapid break in the viscosity of the gelled aqueous fluid, such as a desirable right angle break or a break that occurs at a substantially right angle. All manner of coated metallic particles may be employed. The coated metallic particles described in co-pending patent applications US2011-0135953 A1 filed on Dec. 8, 2009 and U.S. Ser. Nos. 13/220,824, 13/220,832 and 13/220,822 filed on Aug. 30, 2011, and assigned to the same assignee as this application, Baker Hughes, Inc., and which are all incorporated by reference herein in their entirety, are particularly useful. These applications describe coated metallic particles having nanoscale coatings (e.g., about 0.5 nm to about 2500 nm) of Al, Zn, Zr, Mn, Mg, Mo, W, Ni, Ti, Fe, Si, Ca or Sn, or an oxide, carbide or nitride thereof, or a cermet thereof, or a combination of any of the aforementioned materials, wherein the coating layer has a chemical composition and the particle core has a chemical composition that is different than the chemical composition of the coating layer. The coating layers are formed on particle cores of core material, including those having electrolytically reactive particle core materials, including those having a standard oxidation potential greater than or equal to that of Zn, including Mg, Al, Mn, or Zn, or a combination thereof. The particle cores have average particle sizes of about 30 nm or greater. The metallic particles are particularly well-suited for selectively controllable dissolution in a wellbore fluid, such as the aqueous wellbore fluids described herein, and particularly may be configured for rapid dissolution in these fluids. In addition to the coating materials described above, in an exemplary embodiment, a coated particle having a nanoscale coating that includes Al, Zn, Zr, Mn, Mg, Mo, W, Ni, Ti, Fe, Cu, Co, Cr, Si, Ca or Sn, or an oxide, carbide or nitride thereof, or a combination of any of the aforementioned materials, and wherein the coating layer has a chemical composition and the particle core has a chemical composition that is different than the chemical composition of the coating layer, may be particularly desirable. In this embodiment, the particle core may include, for example, a metal selected from Group VA, VIA, VIIA, VIIIA, IB, IIB, IIIB or IVB of the Periodic Table (previous IUPAC American Group notation), or an alloy thereof, or a composite thereof, or a combination thereof. In another exemplary embodiment, the nanoscale coating layer may have thickness range of about 0.5 nm to about 2500 nm, and a range of particle core sizes, including an average particle size of about 8 nm to about 200 µm, and more particularly, an average particle size of about 10 nm to about 20 µm, and even more particularly, an average particle size of about 30 nm to about 10 µm.

The metallic particles may also be deformed to incorporate nanostructuring in the coating layers or particle cores, or both. As used herein, a nanostructured material is a material having a grain size, or a subgrain or crystallite size, less than about 200 nm, and more particularly a grain size of about 10 nm to about 200 nm, and even more particularly an average grain size less than about 100 nm. The nanostructure may include high angle boundaries, which are usually used to define the grain size, or low angle boundaries that may occur as substructure within a particular grain, which are sometimes used to define a crystallite size, or a combination thereof. The nanostructure may be formed in the metallic particle, including in the case of coated particles the particle core or the coating layer or both, by any suitable method, including deformation-induced nanostructure such as may be provided by ball milling a powder to provide metallic particles, and more particularly by cryomilling (e.g., ball milling in ball milling media at a cryogenic temperature or in a cryogenic fluid, such as liquid nitrogen). The stored strain energy associated with nanostructuring may also be utilized to affect selectively controllable dissolution of the metal particles, particularly even dissolution rates that are higher than the dissolution rate of an identical particle that does not have a nanostructured microstructure, i.e., one having stored strain energy associated with the nanostructuring. As also shown comparatively with regard to the coated metallic particles described herein with reference to FIG. 3, in one embodiment an uncoated metallic particle 12 may be selected and configured to begin dissolution more rapidly (i.e., it has a shorter $t_1$) because it does not have a coating layer and may dissolve at a slower rate (i.e., have a longer $t_2$) than a coated particle as illustrated by curve 9.

In an exemplary embodiment, the coating layer, including its composition and size or thickness may, for example, be selected to dissolve at a predetermined rate in the aqueous fluid, and provide a first characteristic and coating working interval for the fluid, such as a coating interval corresponding to a wellbore treatment, such as a fracturing treatment. The coating layer may, for example, be selected to maintain the viscosity of the aqueous fluid at a predetermined level, such as a relatively high level, sufficient to affect a wellbore treatment, such as fracturing. The coating layer may comprise any suitable material, including a polymer, metal, cermet or ceramic, or a composite thereof, or a combination thereof. In one embodiment, the coating layer may include a water soluble or water permeable polymer. In another embodiment, the coating layer may include a metallic coating layer comprising Al, Zn, Zr, Mn, Mg, Mo, W, Ni, Ti, Fe, Cu, Co, Cr, Si, Ca or Sn, or an oxide, carbide or nitride thereof, or a composite thereof, or a cermet thereof, or a combination of any of the aforementioned materials. The coating layer may also include multiple layers of the materials mentioned. In one embodiment, the coating layer may have an average thickness of about 0.5 nm to about 2500 nm. The particle core, including its composition and size, may, for example, be selected and configured to dissolve at a predetermined rate in the aqueous fluid, and provide a second characteristic and a core working interval for the fluid, such as an interval corresponding to breaking the gelled aqueous fluid. The particle core may, for example, be selected to provide a source of a transition metal ion sufficient to promote metal-mediated or metal-catalyzed breaking of the gelled aqueous fluid as described herein and reduce the viscosity of the aqueous fluid to a predetermined level, such as a relatively low level, sufficient to enable removal of the aqueous fluid from the wellbore. Any suitable material may be used for the particle core, including various transition metals or transition metal alloys. In one embodiment, the particle core material may include iron, copper, manganese, cobalt, zinc, nickel, vanadium, platinum, tin, aluminum, molybdenum, platinum, palladium, or an alloy thereof, or a composite thereof, or a cermet thereof, or combination thereof. The particle core may have any suitable thickness, including those described herein.

Figure 4:
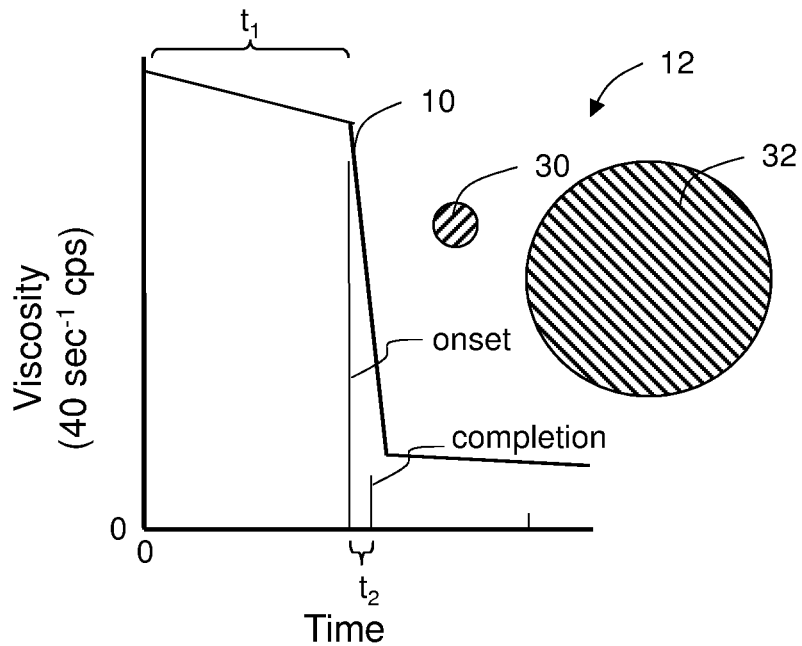
FIG. 4 is a schematic illustration of viscosity as a function of time for a third exemplary embodiment of an aqueous fluid and method of affecting viscosity of the fluid as disclosed herein.

Whether coated or uncoated, the plurality of metallic particles may be formed from one material or combination of materials, or may be formed from more than one material, or more than one combination of materials. Further, the metallic particles may have a single or unimodal average particle size or size distribution of particle sizes, or may have a plurality of average particle sizes or size distributions (multimodal average particle sizes or size distributions). Either or both of these aspects may be used to affect a variable response within the gelled aqueous fluid. For example, a plurality of small metallic particles 12 of a first metallic material 30 can be used to rapidly dissolve and release sufficient first metallic cations to cause a gradual decrease in the viscosity over a first selectively controllable time ($t_1$) interval and plurality of larger particles of a second metallic material 32 may be selected to release sufficient second metallic cations to cause a break or rapid reduction in the viscosity over a second later time interval ($t_2$) as illustrated by dissolution curve 10 in FIG. 4.

In addition to the metallic particles, in one embodiment of the invention, the composition may also include a metal salt, such as ferrous chloride, or a carbonate or a hydroxide, in non-restrictive examples, or a metal complex, or a combination thereof, as an additional source of metal ions. Other suitable sources may include ferric chloride, ferrous gluconate, ferrous glucoheptonate, copper chloride, copper acetate, copper sulfate, cuprous chloride, cuprous nitrate, molybdenum acetate, palladium chloride, palladium nitrate, palladium acetate, nickel chloride, nickel acetate, nickel citrate, nickel formate, nickel gluconate, manganese gluconate, manganese glucoheptonate, manganese chloride, zinc glucoheptonate, zinc chloride, aluminum gluconate, aluminum sulfate or aluminum chloride, or mixtures thereof, or a combination thereof.

Additionally, in another embodiment the metal ions provided by the dissolution of the metallic particles, or from a metal salt or a metal complex, or a combination thereof, may also be complexed or chelated. Suitable sources for complexing and chelating agents include carboxylic acids, aminocarboxylic acids, polyols or alkanolamines and the like, or a combination thereof. Examples of suitable carboxylic acids include fumaric acid, lactic acid, maleic acid, tartaric acid, citric acid, glucaric acid or gluconic acid and the like, or a combination thereof. The carboxylic acids may be, and are preferably in salt form, such as, for example, sodium citrate, ammonium citrate, potassium fumarate, sodium gluconate, sodium glucoheptonate or ammonium lactate, or combinations thereof. Examples of suitable aminocarboxylic acids include, ethylenediaminetetraacetic acid (EDTA), hydroxyethylenediaminetriacetic acid (HEDTA), propylenediaminetetraacetic acid (PDTA), diethylenetriaminepentaacetic acid (DTPA), nitrilotriacetic acid (NTA), iminodisuccinic acid, amino acids, hydroxyethyliminodiacetic acid (HEIDA), and the like. Again, the aminocarboxylic acids may be, and in some cases are preferably in salt form, such as, for example, tetrasodium EDTA, trisodium NTA, and diammonium dihydrogen EDTA, sodium iminodisuccinate or disodium HEIDA, or a combination thereof. Examples of suitable polyols include sorbitol, xylitol, mannitol and the like, or a combination thereof. Examples of suitable alkanolamines include diethanolamine or triethanolamine and the like, or a combination thereof.

It is difficult, if not impossible, to specify with accuracy the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular metallic particles and metallic ion source used; the particular chelant and particular chelant source used; the particular reducing agent and particular reducing agent source used; the temperature of the fluid; the downhole pressure of the fluid, the starting pH of the fluid; and the complex interaction of these various factors. Nevertheless, in order to give an approximate feel for the proportions of the various breaking components to be used in the method of the invention, approximate ranges will be provided. A suitable amount of elemental metal ion may range from about 0.001 to about 2000 ppm, based on the total amount of the aqueous fluid, irrespective of the amount of the metallic particles or other metal ion source (e.g. gluconate, acetate, chloride, chloride dihydrate, etc. type sources). In another embodiment, the amount of elemental metal ion may range from about 0.01 to about 200 ppm, and more particularly may range from about 0.05 to about 50 ppm.

The second optional component is preferably a reducing agent which is from either an organic or inorganic source. Suitable reducing agent sources include organic acids, organic acid salts, amines, alcohols, reducing sugars, ammonium compounds, nitrites, phosphites, sulfites, thiosulfates, thiols, hydrides, tocopherols, tocotrienols or quinones and the like and mixtures thereof, or a combination thereof.

In one embodiment, the optional organic acid used as a reducing agent may be selected from citric acid, ascorbic acid, dehydroascorbic acid, benzoic acid, gluconic acid, lactic acid, erythorbic acid, formic acid, glycolic acid, oxalic acid, adipic acid, glutaric acid, succinic acid, acetic acid, propionic acid, caproic acid, maleic acid, fumaric acid, tartaric acid, cysteine, methionine or phthalic acid and the like and mixtures thereof, or a combination thereof. In another embodiment, the organic acid source may be in an alkali or alkaline earth metal salt form. The salts of organic acids may include citrates, acetates, ascorbates, erythorbates, benzoates, succinates, fumarates, maleates, or gluconates of alkali metals and alkaline earth metals, or a combination thereof. As mentioned, the organic acid is preferred to be in the alkali salt form or ammonium salt form in one embodiment, for example sodium citrate, potassium citrate, ammonium citrate, sodium erythorbate, sodium ascorbate, calcium ascorbate, sodium benzoate, sodium phthalate, diammonium phthalate, sodium gluconate, sodium acetate or sodium oxalate and the like, or a combination thereof. A suitable amount of organic acid salt may range from about 1 to about 80 pptg (pounds per thousand gallons) based on the total amount of the aqueous fluid, irrespective of the amount of the organic acid source. In another embodiment, the amount of organic acid may range from about 4 to about 40 pptg.

In one embodiment, the reducing agent source may include sodium nitrite, sodium sulfite, sodium bisulfite, ammonium bisulfite, sodium thiosulfate, potassium thiosulfate, ammonium thiosulfate, sodium hydrosulfite, thiourea, hydrazine, sodium hydride, lithium hydride, sodium borohydride, lithium aluminum hydride, dithiothreitol, ethyl mercaptan, allyl mercaptan, anthraquinone, naphthoquinone, benzoquinone, glutathione, ethylenethiourea, tocopherols or tocotrienols, or a combination thereof. Other reducing agents known in the art may also be utilized, and mixtures thereof. In one embodiment, a suitable amount of reducing agent may range from about 0.2 to about 60 pptg based on the total amount of the aqueous fluid. In another embodiment, the amount of reducing agent may range from about 0.5 to about 40 pptg.

In one embodiment, the reducing sugars may include monosaccharides or disaccharides, and mixtures thereof. In another embodiment, the reducing sugars may include fructose, mannose, galactose, maltose, lactose or xylose, or a combination thereof. In one embodiment, the amount of reducing sugar may range from about 2 to about 120 pptg based on the total amount of the aqueous fluid, irrespective of the amount of the reducing sugar source. In another embodiment, the amount of reducing sugar of may range from about 5 to about 50 pptg.

In one embodiment, the optional hydrogenation-dehydrogenation agent besides water may be selected from aldehydes, ketones, alcohols, glycols, sugar alcohols, carbonates, phosphates, borohydrides or ammonium compounds, and the like and mixtures thereof, or a combination thereof. In another embodiment, the optional hydrogenation-dehydrogenation agent source may include acetaldehyde, propionaldehyde, butyraldehyde, cinnamaldehyde, acetone, methyl ethyl ketone, methyl isopropyl ketone, glycine, lysine, arginine, glutamine, ammonia, ammonium chloride, urea, tetramethylammonium chloride, choline, hexamethylene diamine, triethylene glycol diamine, methanol, isopropanol, ethanol, hexanol, glycerol, propylene glycol, tripropylene glycol, diethylene glycol, disodium hydrogen phosphate, sodium dihydrogen phosphate, ammonium dihydrogen phosphate, boric acid, sodium borate, sodium-calcium borate, sodium carbonate, sodium bicarbonate, sodium sesquicarbonate, sodium borohydride, sodium hydride or lithium aluminum hydride, and the like, or a combination thereof. In one embodiment, a suitable amount of hydrogenation-dehydrogenation agent may range from about 1 to about 100 pptg based on the total amount of the aqueous fluid, irrespective of the amount of the hydrogenation-dehydrogenation agent. In another embodiment, the amount of hydrogenation-dehydrogenation agent may range from about 5 to about 50 pptg.

Optionally, one or more suitable conventional or future oxidizing agents useful for catalytic redox reactions with viscoelastic surfactant molecules may also be employed in the breaking composition of this invention. Appropriate oxidizers include alkali metals and alkaline earth metals of persulfates, percarbonates, perborates, peroxides, hydroperoxides, bromates, bromides, hypochlorites, chlorites, perchlorates, periodates, permanganates, perphosphates or hydrogen peroxide, and the like and mixtures thereof, or a combination thereof. In one embodiment, a suitable amount of oxidizer may range from about 0.5 to about 100 pptg based on the total amount of the aqueous fluid. In another embodiment, the amount of oxidizer may range from about 2 to about 50 pptg.

In one embodiment, an optional additional component of the breaking composition includes an organic compound that slowly hydrolyzes upon fluid heating into a Bronsted-Lowry acid as an organic hydrogenation source. These organic compounds, which may typically include organic acids, may include citric acid esters, fumaric acid esters or acetic acid esters, and the like, or a combination thereof. The specific organic compounds include ethyl acetate, ethyl acetoacetate, triethyl citrate, tributyl citrate or diethyl fumarate, or a combination thereof. In one embodiment, a suitable amount of organic acid may range from about 0.2 to about 8 gptg based on the total amount of the aqueous fluid. In another embodiment, the amount of organic acid may range from about 0.5 to about 4 gptg.

Any suitable mixing apparatus may be used for method 100, including those used for both batch and continuous mixing. In the case of batch mixing, the VES and the aqueous fluid are blended for a period of time sufficient to form a gelled or viscosified solution. Any suitable VES may be used, including any of the VES systems that are familiar to those in the well service industry, and may include amines, amine salts, quaternary ammonium salts, amidoamine oxides or amine oxides, or mixtures thereof and the like, or a combination thereof. Suitable amines, amine salts, quaternary ammonium salts, amidoamine oxides, and other surfactants are described in U.S. Pat. Nos. 5,964,295; 5,979,555; 6,239,183; and 6,703,352, which are incorporated herein by reference in their entirety.

VES systems improve the fracturing (frac) fluid performance through the use of a polymer-free system. These systems offer improved viscosity breaking, higher sand transport capability, are more easily recovered after treatment, and are relatively non-damaging to the reservoir. The VES systems are also more easily mixed "on the fly" in field operations and do not require numerous co-additives in the fluid system, as do some prior polymer-based systems.

The VES suitable for use include various non-ionic, cationic, amphoteric or zwitterionic surfactants, or a combination thereof. Specific examples of zwitterionic/amphoteric surfactants include dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid or salicylic acid, or their salts, or a combination thereof.

Some non-ionic fluids are inherently less damaging to the producing formations than cationic fluid types, and are more efficacious per pound than anionic gelling agents. Amine oxide viscoelastic surfactants have the potential to offer more gelling power per pound, making them less expensive than other fluids of this type. The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one embodiment, R is an alkyl or alkylamido group averaging from about 8 to 16 carbon atoms and R' are independently alkyl groups averaging from about 2 to 3 carbon atoms. In an alternate embodiment, the amidoamine oxide gelling agent is Akzo Nobel's Aromox APA-T formulation, which should be understood as a dipropylamine oxide since both R' groups are propyl.

Materials described in U.S. Pat. No. 5,964,295 include ClearFRAC™, which may also comprise greater than 10% of a glycol. One preferred VES is an amine oxide. As noted, a particularly preferred amine oxide is APA-T, sold by Baker Hughes as SurFRAQ™ VES. SurFRAQ is a VES liquid product that is about 45-55% APA-T and 35-45% propylene glycol. These VES are capable of gelling aqueous solutions to form a gelled base fluid. The additives of this invention may also be used in Diamond FRAQ™ which is a VES system, similar to SurFRAQ, sold by Baker Hughes.

Suitable VES materials include commonly known materials such as Aromox APA-T manufactured by Akzo Nobel and other known VES gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step. Thus, depending on the application, the VES is added to the aqueous fluid in concentrations ranging from about 0.5 to 25% by volume, alternatively up to about 12% by volume of the total aqueous fluid (from about 5 to 120 gallons per thousand gallons (gptg)). In another embodiment, the range is from about 0.6 to about 10.0% by volume VES product of the total aqueous fluid. In yet another embodiment, the amount of VES ranges from 0.8 to about 6% by volume of the total aqueous fluid.

It is expected that the breaking compositions described herein can be used to reduce the viscosity of a VES-gelled aqueous fluid regardless of how the VES-gelled fluid is ultimately utilized. For example, the viscosity breaking compositions could be used in all VES applications including, VES-gelled friction reducers, VES viscosifiers for loss circulation pills, fracturing fluids, gravel pack fluids, viscosifiers used as diverters in acidizing, VES viscosifiers used to clean up drilling mud filter cake, remedial clean-up of fluids after a VES treatment (post-VES treatment), and the like.

A value of the method 100 and compositions herein is that a fracturing fluid or other fluids may be designed to have enhanced breaking characteristics, such as control of the onset of the break and high breaking rates so as to enable desirable right angle breaking curves. That is, fluid breaking is no longer entirely dependent on external reservoir conditions for viscosity break: the rate of viscosity reduction, if essentially complete break is achieved, occurs more completely throughout the reservoir interval. Importantly, better clean-up of the VES fluid from the fracture and wellbore may be achieved thereby. Better clean-up of the VES directly influences the success of the fracture treatment, which is an enhancement of the well's hydrocarbon productivity. Previous VES fluid clean-up limitations and failures may now be overcome or improved by the use of this clean-up technology In order to practice method 100, an aqueous fluid, such as a fracturing fluid, is prepared by blending the constituents described herein in any order. In one embodiment, this may include blending a VES and the breaking composition together into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. Alternatively, the breaking composition of this invention may be added separately. In this embodiment, in the case of a fracturing fluid, a propping agent may optionally be added to the base fluid after the addition of the VES. The propping agent may include quartz sand grains, glass and ceramic beads, bauxite grains, walnut shell fragments, aluminum pellets or nylon pellets, and the like, or a combination thereof. A propping agent may be added in a concentration of about 1 to 14 pounds per gallon (120-1700 kg/m³) of the total fluid composition, but higher or lower concentrations can be used as the fracture design required. The base fluid may also contain other conventional additives common to the well service industry such as water wetting surfactants, biocides, non-emulsifiers and the like. As disclosed herein the base fluid also may include other non-conventional additives which can contribute to the breaking action of the VES fluid, and which are added for that purpose.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any SI volume unit, e.g. 60.0 liters/–1000 liters) amine oxide VES, such as Aromox APA-T from Akzo Nobel, in a 4% (w/v) (332 lb/1000 gal, 39.8 kg/m³) KCl solution at a pH ranging from about 6.0 to about 9.0. The breaking components are added together with the VES addition, after the VES addition, or in a separate step after the fracturing operation is complete.

In one embodiment, the method is practiced in the absence of gel-forming polymers and/or gels or aqueous fluid having their viscosities enhanced by polymers. However, combined use with polymers and polymer breakers may also be of utility. For instance, polymers may also be added to the VES-gelled fluid for fluid loss control purposes. Types of polymers that may serve as fluid loss control agents include, but are not necessarily limited to, various starches, polyvinyl acetates, polylactic acid, guar and other polysaccharides, gelatins, and the like.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method for breaking the viscosity of an aqueous fluid gelled with a viscoelastic surfactant (VES), comprising:
   providing an aqueous fluid that is a brine comprising KCl, NaCl, CaCl$_2$, or CaBr$_2$;
   adding to the aqueous fluid, in any order:
   at least one VES comprising a non-ionic surfactant, cationic surfactant, amphoteric surfactant or zwitterionic surfactant, or a combination thereof, in an amount sufficient to form a gelled aqueous fluid comprising a plurality of elongated micelles and having a viscosity, and
   a plurality of metallic particles to produce a mixture comprising dispersed metallic particles dispersed within the gelled aqueous fluid, the metallic particles comprising coated metallic particles that comprise metallic particle cores of a transition metal selected from Group VA, VIA, VIIA, VIIIA, IB, IIB, IIIB or IVB of the Periodic Table, or an alloy thereof, or a combination thereof that are configured for dissolution in the aqueous fluid to provide a source of at least one transition metal ion and metal coating layers that are configured to selectively control access of the aqueous fluid to the particle core; and
   selectively controllable dissolution of the metallic particles in the gelled aqueous fluid to provide the at least one transition metal ion in an amount effective to reduce the viscosity.

2. The method of claim 1, wherein the at least one transition metal ion is present in an amount of about 0.01 to about 2000 ppm of the gelled aqueous fluid.

3. The method of claim 1, wherein the metal coating layers comprise Al, Zn, Zr, Mn, Mg, Mo, Ti, Fe, Cu, Co, Cr, Si, Ca, or Sn, or a combination of any of the aforementioned materials, and wherein the coating layer has a chemical composition and the particle core has a chemical composition that is different than the chemical composition of the coating layer.

4. The method of claim 1, wherein the coating layers have an average thickness of about 0.5 nm to about 2500 nm.

5. The method of claim 1, wherein the metallic particles have an average particle size of about 8 nm to about 80 μm.

6. The method of claim 1, wherein the metallic particles have an average particle size of about 10 nm to about 20 μm.

7. The method of claim 1, wherein the metallic particles have an average particle size of about 30 nm to about 10 μm.

8. The method of claim 1, wherein the composition further comprises at least one chelating agent.

9. The method of claim 8, wherein the composition further comprises at least one reducing agent source.

10. The method of claim 9, wherein the reducing agent source comprises erythorbates, dehydroascorbates, citrates or ascorbates, or a combination thereof.

11. The method of claim 8, wherein the chelating agent comprises carboxylic acids, aminocarboxylic acids, polyols or alkanolamines, or a combination thereof.

12. The method of claim 8, wherein the amount of chelating agent ranges from about 0.1 to about 50 pptg of the gelled aqueous fluid.

13. The method of claim 1, wherein the transition metal ion source further comprises a transition metal salt or transition metal complex.

14. The method of claim 13, wherein the transition metal salt or transition metal complex comprises a transition metal selected from Group VA, VIA, VIIA, VIIIA, IB, IIB, IIIB, or IVB of the Periodic Table, or an alloy thereof, or a combination thereof.

15. The method of claim 1, wherein dissolving the metallic particles in the gelled aqueous fluid provides a plurality of sources of transition metal ions.

16. The method of claim 1, wherein the viscosity of the gelled aqueous fluid is reduced by disaggregating or rearranging a micelle structure of the VES.

17. The method of claim 1, wherein the composition reduces the viscosity of the gelled aqueous fluid by chemically altering an effective amount of the VES required to increase the viscosity of the aqueous fluid.

18. The method of claim 1, wherein the metallic particles have a multimodal distribution of average particle sizes.

19. The method of claim 1, wherein the metallic particles comprise nanostructured metallic particles.

* * * * *